July 20, 1937.  S. L. HARBISON  2,087,644
TRAP
Filed Jan. 19, 1937
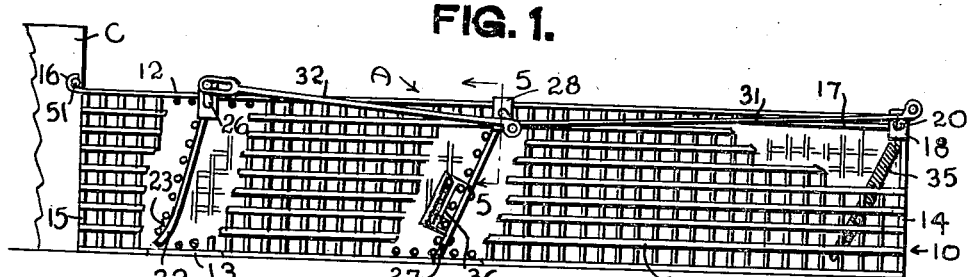
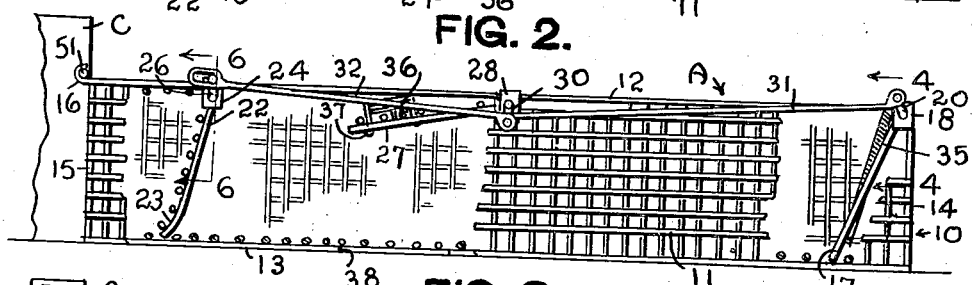
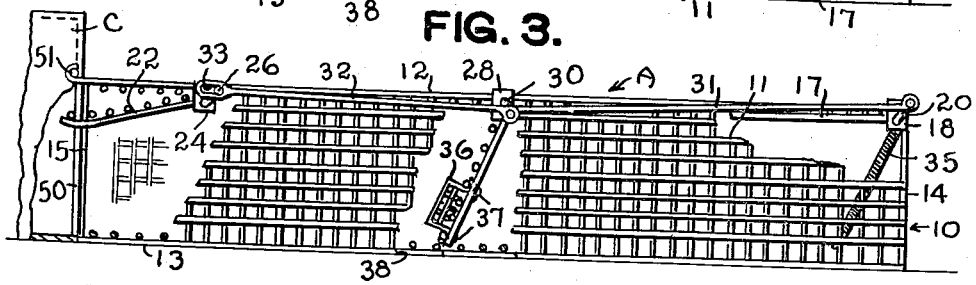
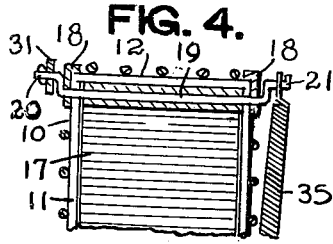
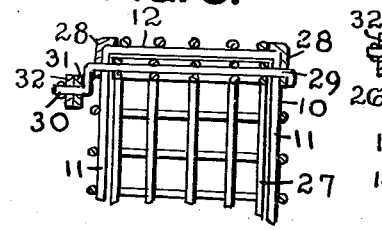
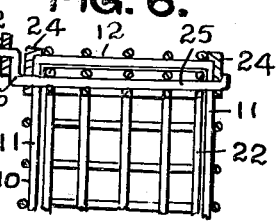
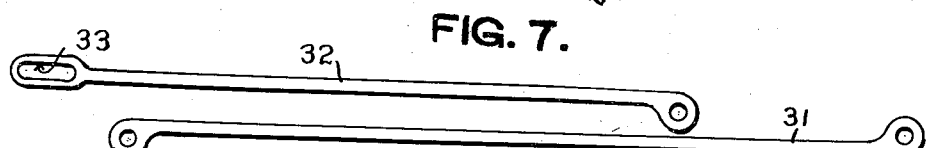
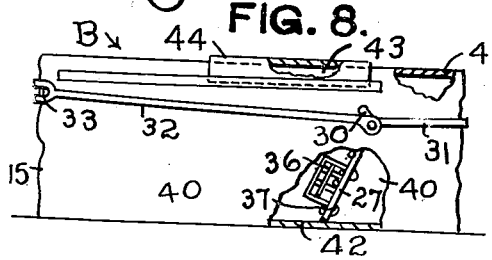
INVENTOR.
Sam L. Harbison
BY
ATTORNEYS.

Patented July 20, 1937

2,087,644

UNITED STATES PATENT OFFICE 2,087,644

TRAP

Sam L. Harbison, Knoxville, Tenn.

Application January 19, 1937, Serial No. 121,367

7 Claims. (Cl. 43—76)

This invention relates to traps and more particularly to self-resetting traps for animals and the like, embodying an arrangement whereby the animal cannot actually consume the bait.

An important object of the invention is to provide a novel self-resetting trap, having a plurality of coacting closures or barriers arranged so that the animal cannot escape when once caught.

Another important object is to provide a self-resetting trap which is quick and positive in its actions, will not be apt to get out of order, comprises but few parts and is sturdy in build.

Still another object is to provide a trap having a plurality of swinging closures or barriers, but with these arranged so that the trap is relatively low and may be placed in spaces having but limited height.

Another object is to provide a trap which is not dependent upon the animal pulling at or pulling away any of the bait in order to spring and/or reset it.

Other objects and advantages will be apparent during the course of the following detailed description, taken in connection with the accompanying drawing, and in which drawing:—

Figure 1 is a side elevation of one form of the novel trap, in a set position, parts being broken away in order to better illustrate portions of the construction.

Figure 2 is a like elevation, with the parts in a sprung position.

Figure 3 is an elevation similar to Figures 1 and 2, but with the parts in a reset position after the animal has endeavored to get after the bait and as it is passing under the innermost barrier.

Figures 4, 5 and 6 are transverse sections upon their respective lines of Figures 1 and 2.

Figure 7 is an enlarged view of link members forming a part of the construction.

Figure 8 is a fragmentary view of the novel trap wherein solid walls are provided for the body of the same.

In the drawing, wherein for the purpose of illustration are shown two forms of the invention, similar reference characters designate corresponding parts throughout the several views and the letter A may designate one form generally, the letter B, another form, and the letter C a container or receptacle with which the traps A and B may be associated.

The trap A includes a main body portion or housing 10, preferably comprising a pair of parallel side walls 11, a top or roof 12, and a bottom or floor 13, with the top 12 and bottom 13 joining the side walls 11. The main body portion 10 is open at one end 14 and may be open at the other end 15. As shown in Figures 1 to 3, this end 15 is open and is provided with suitable means, cooperating with means disposed on the exterior of the container C to attach the main body portion 10 thereto. This means on the main body portion 10 may be hooks 16 extending outwardly from the end 15, and their association with the means upon the container C will be later described.

In the example shown in Figures 1 to 3, the main body portion is constructed of woven wire or wire mesh but it may be made of spaced apart bars, metal or other strips, and the like.

The open end 14 of the main body portion 10 may be regarded as the entrance end of the trap and is closed by a closure or barrier 17. Preferably, this closure is a sheet of suitable metal having a width slightly less than the width of the main body portion 10, measured from one inner face of one side wall 11 to the inner face of the other side wall 11. However, the length of the closure 17 is greater than the height of the main body portion 10, as measured from the inner face of the top 12 to the inner face of the bottom 13. This permits the closure 17 to extend, in a closed position, on a slope downwardly from the end 14 towards the end 15. This closure 17 is preferably hung to provide a flap closure by means of a pair of bearings 18, one carried by each of the side walls 11, at the end 14 and close to the top 12. A pivot member 19 is secured to the upper end of this closure 17 and extends through the bearings 18, terminating at one end in a crank 20 and at the other end in a similar crank which, for the purpose of more clearly distinguishing it from the crank 20, will be designated as a crank portion 21. The free ends of the crank 20 and crank portion 21 have their axes coincident.

A second closure 22 is spaced from the closure 17 and is preferably at the end 15 of the main body portion 10. It may be of substantially the same dimensions as those of the closure 17 but is preferably of wire mesh or wire fabric and its lower or free end may be slightly curved as at 23. It is also disposed, when in a closed position, as is the closure 17, with its upper end nearest the end 14 and its lower end nearest the end 15. The closure 22 is also a flap closure and preferably is hung in a manner similar to the closure 17 having a pair of bearings 24, one carried by each of the side walls 11 just below the top 12. A pivot member 25 is secured to the upper end of the closure 22 and extends through the bearings 24, terminating at one end in a crank 26, preferably substantially similar to the crank 20.

A third closure or barrier 27 is provided and is disposed intermediate the space between the closures 17 and 22. It may be of substantially the same dimensions as these other closures and hung similarly, being provided with a pair of bearings 28, one carried by one of the side walls 11 and the other carried by the other side wall 11, just below the top 12. Through these bearings 28 extend the ends of a pivot member 29 rigidly secured to the upper end of the closure 27. The pivot member 29 terminates at one end in a crank 30 which is substantially similar to the cranks 20 and 26, all extending from the same side of the wall 11. By comparing the positions of the three cranks 20, 26 and 30, as shown in Figure 1, it will be seen that when the first closure 17 is in an open position, its crank 20 extends upwardly and to the right at an angle of about 45° from the horizontal, that when the third closure 27 is in a closed position, its crank 30 extends downwardly and to the right at an angle of about 45°, while the crank 26 extends substantially vertically when the closure 22 is in a closed position and that upon opening of the closure 22, the crank 26 moves clockwise.

Connecting the three cranks 20, 26 and 30, are two links 31 and 32. Link 31 extends from crank 20 to crank 30, and link 32 extends from crank 30 to crank 26. While the connections of link 31 to cranks 20 and 30 are pivotal, with no free movements, and the connection of link 32 to crank 30 is also pivotal with no free movements, the connection of link 32 to crank 26 allows for free movement of link 32 without turning crank 26. This is made possible by providing a slot 33 in the end of link 32 nearest crank 26, through which extends the end of this crank. When the third closure 27 is in a closed position, the position of the slot 33 with respect to the free end of crank 26 is such that the second closure 22 may be raised, but when the third closure 27 is in an open position, the position of the slot 33 with respect to the free end of crank 26 is such that this end of the crank 26 has reached the end of the slot 33. The assembly constituting the three pivot members 19, 25 and 29, cranks 20, 26 and 30, and links 31 and 32 may be said to constitute a means for automatically closing the first closure 17 upon opening of the third closure 27 and for automatically opening the first closure 17 and closing the third closure 27, i. e., resetting the trap, upon opening of the second closure 22, as will be more fully described.

To insure a quick opening and closing action of the closures 17 and 27, a contraction coil spring 35 may be provided. This coil spring 35 is disposed exteriorly of the body portion 10, in the example shown, with one end secured to the crank portion 21 and its other end secured to a side wall 11. The position of the crank portion 21 is such that the closure 17 will be positive, since the crank portion 21 will be carried past dead center by the spring 35 both upon opening and closing of the closure 17.

A suitable bait box or container 36 may be provided and be constructed of wire mesh, forming a small, open mouthed basket, having a plurality of hooks 37 extending from the edges of the mouth so that it may be hooked upon the inner face of the closure 27 or into the top 12 of the body portion 10, as may be desired. An example of a suitable location is shown in Figures 1 to 3, altho it is apparent that, because of the wire mesh walls of the body portion 10 and the closure 27, this bait box may be positioned at a number of different suitable locations, just so that the animal in endeavoring to get at the bait, will force the closure 27 to an open position. So that this bait box 36 can be easily positioned, the floor 13 may be provided with an aperture 38, through which the hand may be passed. This aperture preferably extends from the base of the closed third closure 27 towards the end 15.

The form B, with its essential differences over form A, comprises, preferably, solid side walls 40, a solid top or roof 41 and solid floor or bottom 42. Top 41 may be, if desired, arcuate and it is provided with an opening 43 which extends from adjacent the upper end of the third closure 27 towards the end 15. This opening may be provided with a suitable removable closure 44, such as a slide, whereby the bait box 36 may be suitably positioned upon the closure 27, as has been described in connection with form A. Otherwise, the form B is similar to form A, and the corresponding parts are similarly numbered.

The receptacle or container C may be any suitable one adapted to hold the animal or animals after they have passed under the barrier or closure 22. It should have an aperture 50 of a height and width about that of the traps A or B and have projections 51 or other means whereby the hooks 16 may cooperate therewith so as to securely couple the traps thereto, with the aperture 50 aligning with the passageway through the trap.

The trap, either form A or B, is initially set by forcing up the closure 17 until the spring 35 swings the crank portion 21 past dead center. This will close the closure 27, but will not affect the closure 22 which, because of its weight and because it hangs downwardly, will always move to a closed position. With the bait box 36 in a desired position, such as hung upon the inner face of the closure 27, the trap is ready. When the animal enters at the end 14 it will move across the floor 13 until it comes to the closed barrier or closure 27 and because of the open work formation of this closure, will see and smell the bait upon the other side of it. The animal will soon nose open the barrier 27 and as it rises the link 31 and cranks 20 and 30 associated therewith, will cooperate to close the closure 17, the action being positive because the crank portion 21 will again move past dead center and the action be hastened by the spring 35. Since the animal can no longer exit from the end 14, because of the closed barrier 17, it will move toward the end 15 and eventually nose up the closure 22 and pass into the receptacle C, whereupon the closure 22 will drop, by gravity, to a closed position. As the closure 22 is raised, this will swing the closure 27 to a closed position and at the same time swing the closure 17 to an open position, due to the links 31 and 32 and cranks 20, 26 and 30, assisted by the coil spring 31 and crank portion 21. The trap is now reset. The reason the opening of closure 22 will reset the trap is because of the fact that when closure 27 is open, link 32 has moved toward crank 26 so that the free end of crank 26 is about in contact with the wall at the right hand end of the slot 33, and when closure 22 is swung open, the crank 26 will force link 32 toward the right and, turning crank 30, will close closure 27 and this movement of crank 30 will be communicated to link 31 and crank 20, opening closure 17, so that the trap is then in a reset condition.

Various changes may be made to the forms of invention herein shown and described, without departing from the spirit of the invention or the scope of the claims.

What is claimed is:

1. In a trap, a hollow body portion open at one end, a first pivoted closure for said end, a second pivoted closure spaced from said first closure, a third pivoted closure intermediate said first and second closures, and means for automatically closing said first closure upon opening of said third closure, and for automatically opening said first closure and closing said third closure upon opening of said second closure.

2. In a trap, a hollow body portion open at one end, a first, a second and a third pivoted closure for said body portion, one of said closures being positioned adjacent said open end and the other closures being spaced apart within said hollow body portion and spaced from said closure adjacent said open end, and means for automatically closing one of said closures upon opening of another of said closures, and for automatically opening one of said closures and closing another of said closures upon opening of the closure hitherto closed.

3. In a trap, a hollow body portion having parallel side walls, a top and a bottom and being open at one end, a flap closure for said end, a flap closure spaced from said first closure and a third flap closure intermediate said other closures, all of said closures being disposed within said portion, and being pivoted to said side walls thereof, adjacent said top and sloping downwardly to said bottom, and means for simultaneously closing said first closure upon opening of said third closure, and for simultaneously opening said first closure and closing said third closure upon opening of said second closure.

4. In a trap, a hollow body portion having parallel side walls, a top and a bottom and being open at one end, a flap closure for said end, a flap closure spaced from said first closure and a third flap closure intermediate said other closures, all of said closures being disposed within said portion, and being pivoted to said side walls thereof, adjacent said top and sloping downwardly to said bottom, means for simultaneously closing said first closure upon opening of said third closure, and for simultaneously opening said first closure and closing said third closure upon opening of said second closure, including a separate pivot member rigidly connected with each closure, a separate link-engaging crank operatively connected with each pivot member, and a pair of links operatively connected with said cranks, one of said links being provided with a slot into which extends the free end of the crank operatively connected with the pivot member of said second closure, and spring means for urging said first closure to a closed position upon operation of said first means closing said first closure upon opening of said third closure and urging said first closure to an open position upon operation of said first means closing said third closure.

5. In a trap, a hollow body portion having parallel side walls, a top and a bottom and being open at one end, a flap closure for said end, a flap closure spaced from said first closure and a third flap closure intermediate said other closures, all of said closures being disposed within said portion, and being pivoted to said side walls thereof, adjacent said top and sloping downwardly to said bottom, means for simultaneously closing said first closure upon opening of said third closure, and for simultaneously opening said first closure and closing said third closure upon opening of said second closure, including a separate pivot member rigidly connected with each closure, a separate link-engaging crank operatively connected with each pivot member, and a pair of links operatively connected with said cranks, one of said links being provided with a slot into which extends the free end of the crank operatively connected with the pivot member of said second closure, and spring means for urging said first closure to a closed position upon operation of said first means closing said first closure upon opening of said third closure and urging said first closure to an open position upon operation of said first means closing said third closure, including a crank portion operatively connected with that end of said pivot member, rigidly connected with said first closure, opposite the end to which said link-engaging crank is connected, and a contraction spring extending from said crank portion to said hollow body portion, said crank portion being to one side of dead center when said first closure is in a closed position and being to the other side of dead center when said first closure is in an open position.

6. In a trap, a hollow body portion including a roof, and being open at one end, a first flap closure for said open end, a second flap closure within said hollow body portion and spaced from said first closure and a third flap closure wholly within said hollow body portion and intermediate said first and second closures, whereby a compartment is provided between said first and third closures and a compartment between said third and second closures, a bait receptacle within said last named compartment disposed so that an occupant of said trap will close said first closure when attempting to reach said bait, by opening said third closure and spring means for assisting in opening said first closure upon closure of said third closure.

7. In a trap, a hollow body portion including a roof, and being open at one end, a first flap closure for said open end, a second flap closure within said hollow body portion and spaced from said first closure and a third flap closure wholly within said hollow body portion and intermediate said first and second closures, whereby a compartment is provided between said first and third closures and a compartment between said third and second closures, a bait receptacle within said last named compartment, means for detachably securing said bait container directly upon said third closure in a position extending into said last named compartment, and means for automatically opening said first closure upon closure of said third closure.

SAM L. HARBISON.